Nov. 29, 1938.   W. E. WOODARD   2,138,053
VALVE MOTION MECHANISM FOR LOCOMOTIVE ENGINES
Filed Jan. 21, 1937   11 Sheets-Sheet 1

INVENTOR
William E. Woodard
BY
Synnestvedt + Lechner
ATTORNEYS

Nov. 29, 1938.       W. E. WOODARD       2,138,053
VALVE MOTION MECHANISM FOR LOCOMOTIVE ENGINES
Filed Jan. 21, 1937    11 Sheets-Sheet 6

INVENTOR
William E. Woodard
BY
Synnestvedt & Lechner
ATTORNEYS

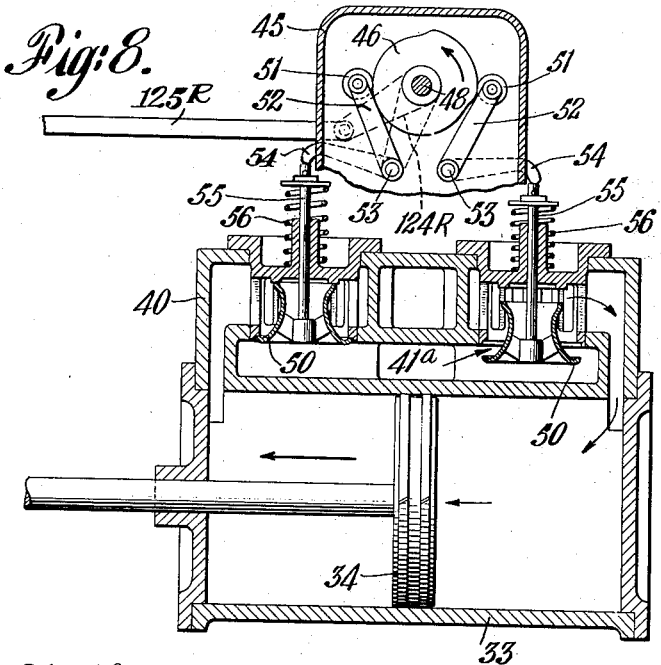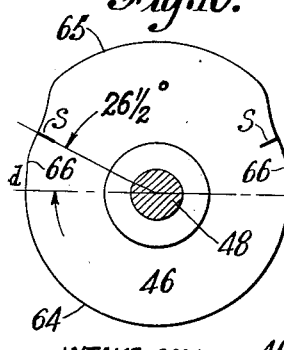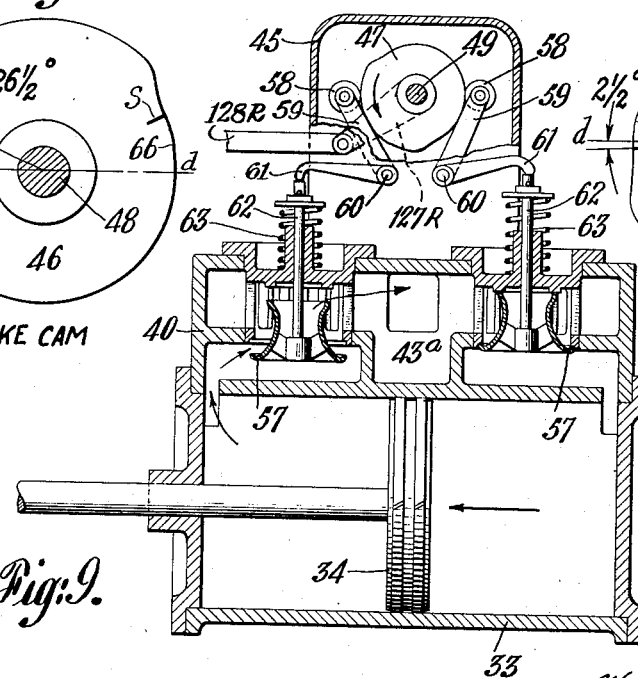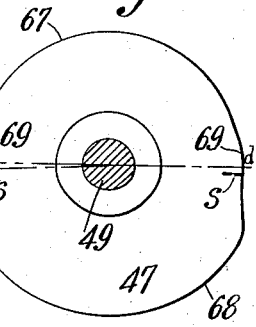

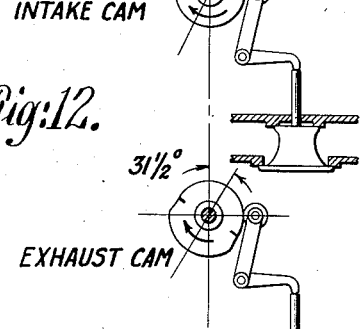
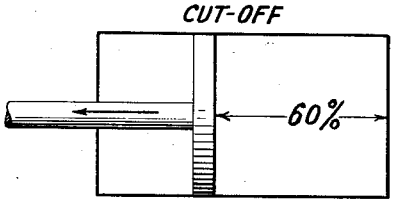
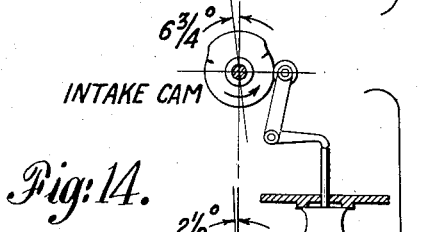
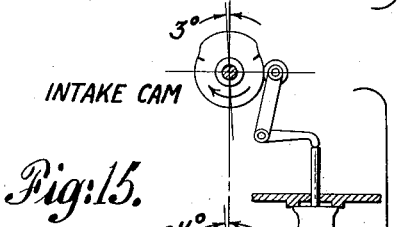
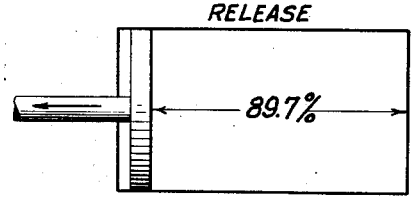
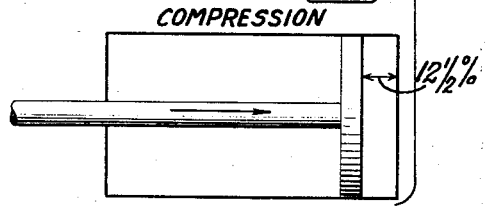

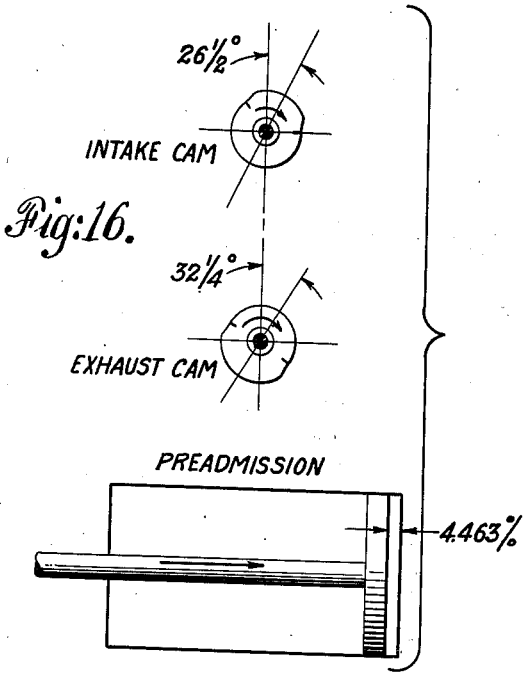
Fig:16.
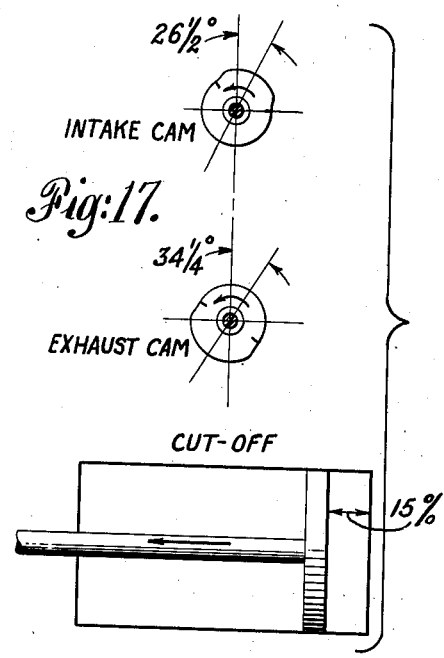
Fig:17.
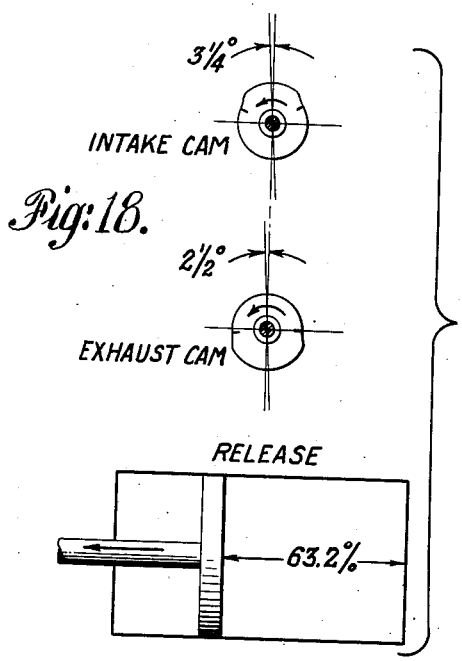
Fig:18.
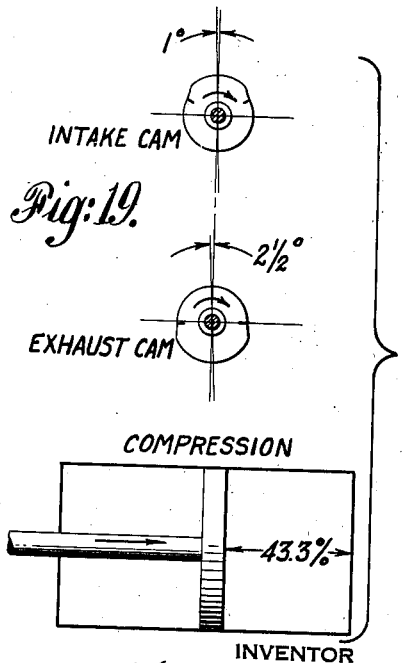
Fig:19.

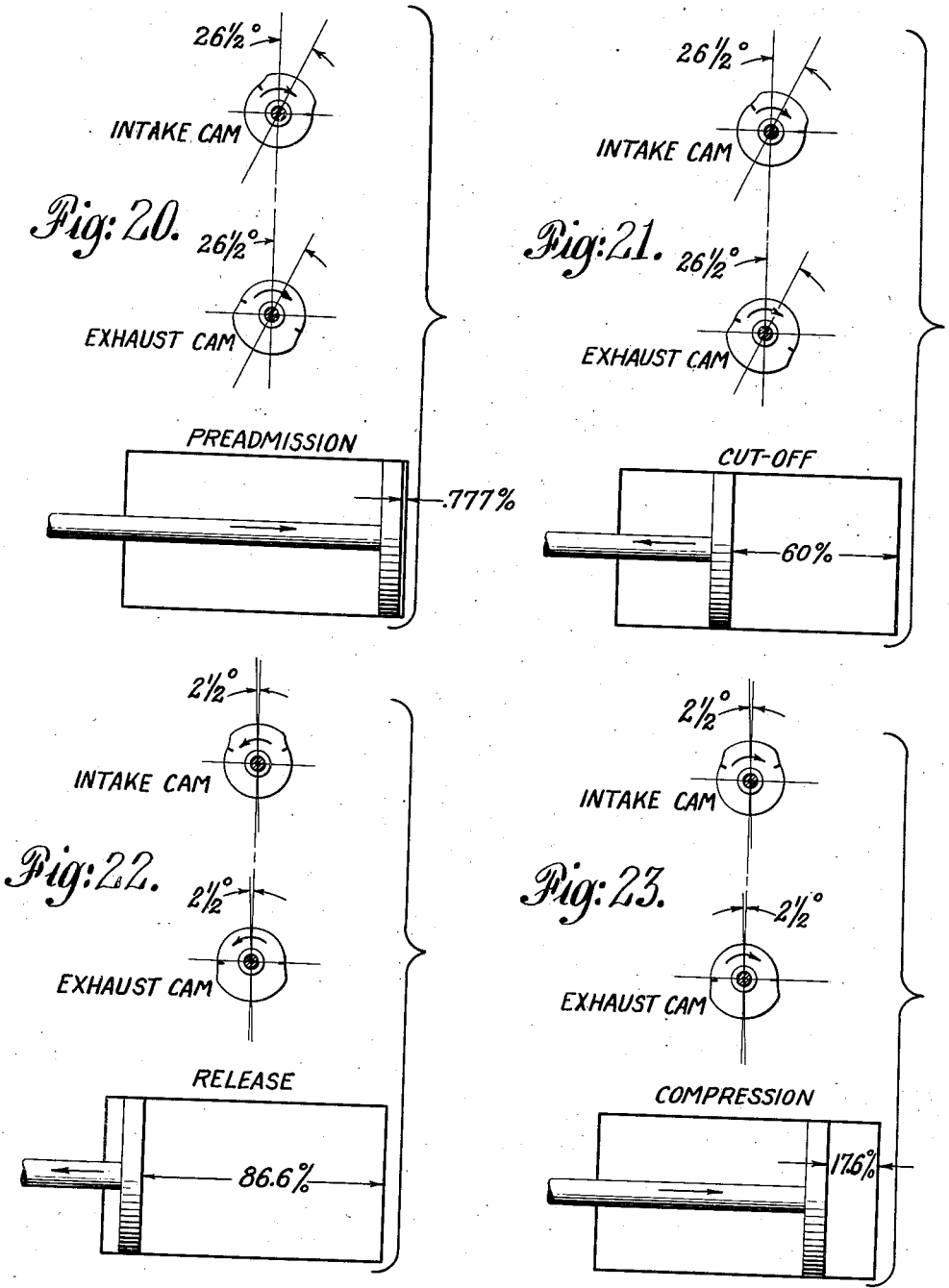

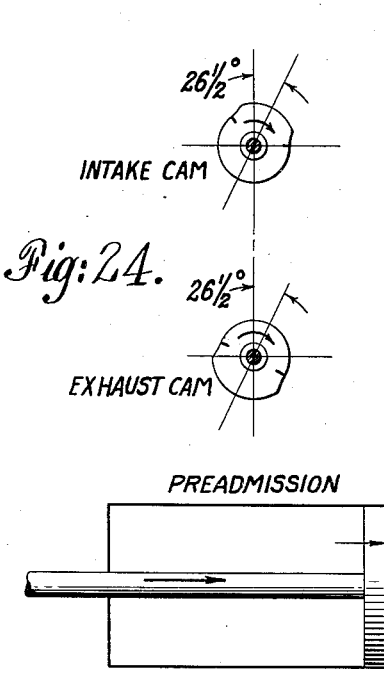
Fig: 24. PREADMISSION
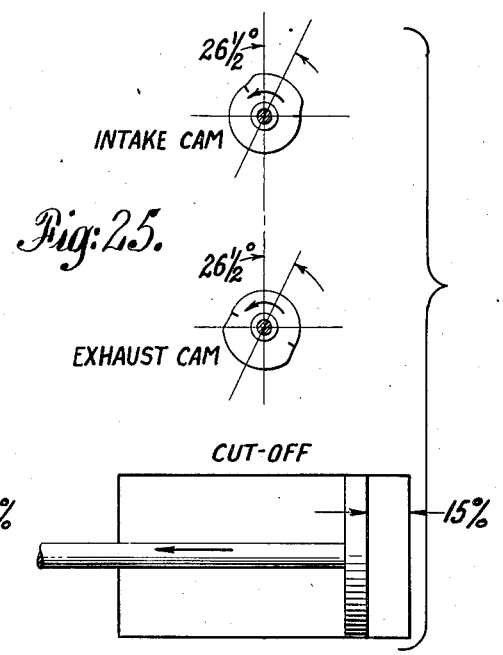
Fig: 25. CUT-OFF
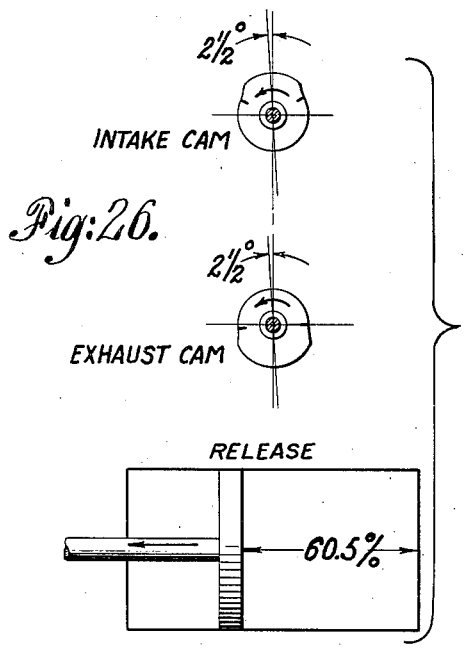
Fig: 26. RELEASE
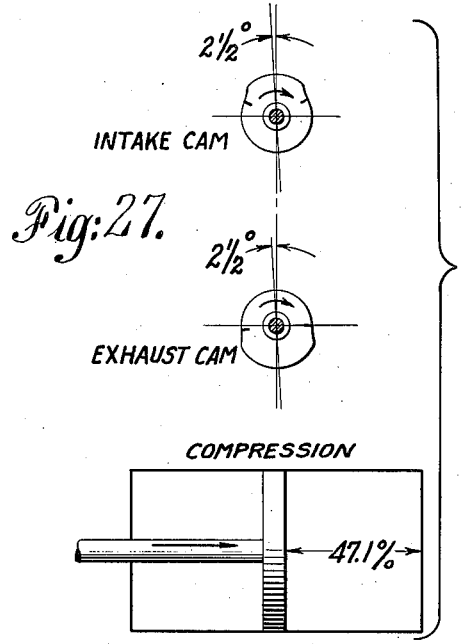
Fig: 27. COMPRESSION Patented Nov. 29, 1938

2,138,053

UNITED STATES PATENT OFFICE 2,138,053

VALVE MOTION MECHANISM FOR LOCOMOTIVE ENGINES

William E. Woodard, Forest Hills, N. Y.

Application January 21, 1937, Serial No. 121,398

22 Claims. (Cl. 121—116)

*Field of the invention*

This invention relates to valve motion mechanism for locomotive engines, or for other fluid-pressure engines of the variable cut-off type. While certain aspects of the invention are adaptable to steam engines having various different numbers, arrangements and types of cylinders, pistons, valves and other parts making up the general assembly of the engine, the invention is especially useful in association with reversible locomotive steam engines of the double-acting two-cylinder type equipped with poppet valves and oscillating cams for lifting and seating of the valves, and therefore the invention will be herein illustrated and described with reference to such a locomotive engine.

*Objects and advantages*

One of the primary purposes of the invention is to obtain an effective timing of the steam admission valve events independent of the effective timing of the steam exhaust valve events, and an adjustment of said events, whereby a substantial improvement in the relationship of the several valve events throughout the range of cut-off adjustment may be secured; and in accomplishing this the invention contemplates the employment of separate steam valve means to control admission and cut-off and separate exhaust valve means to control release and compression, and the actuation thereof, preferably through the intermediation of separate oscillating cams, by means of independent operating connections from the variably adjustable valve gear to the inlet and exhaust cam shafts.

A further important object of the invention, closely allied to the foregoing, is to make possible the employment in practice of a wider range of cut-off adjustment, particularly in the direction of earlier cut-offs of the steam admission than have heretofore been feasible, whereby the steam can be utilized more expansively and thus more efficiently, particularly at the higher locomotive operating speeds which are now becoming increasingly employed on the railroads in an effort to meet competition from aircraft and other forms of transportation.

The two major objects above mentioned, and their concomitant advantages, will be better understood after a brief consideration of the relationship between the several valve events produced in locomotive engines by valve motions now commonly in use.

In locomotives now generally in service there is provided for each cylinder a single valve—which may be of the piston, slide, or other type—to control for both ends of the cylinder all four of the valve events, namely: admission (or pre-admission), cut-off, release, and compression. Such valve, for each cylinder, is commonly actuated by motion work deriving part of its movement from the crosshead of the associated piston and part of its movement from the rotating motion of a crank on the main driving wheel through a swinging link and an adjustable link block and radius rod, the two motions being combined by a combination lever, ordinarily termed the "lap and lead" lever; the position of the valve on its seat relative to the position of the piston being reversible by means of the ordinary reverse gear, for forward and reverse operation of the engine; and the point of cut-off being adjustable though the same mechanism, by variably setting the position of the radius rod link block in the link, by which the proportion of the motion derived from the crank is varied with respect to the motion derived from the crosshead. Although the valves and valve gear may take forms other than that just briefly described, it is typical of this art that the four valve events are inextricably linked together in such manner that a change in the adjustment of the valve for varying the cut-off produces undesirable changes in all the other valve events.

If, in these common constructions, the valve and the ports which it controls, and the motion work which actuates the valve, are so designed and proportioned as to effect the most desirable relationship between the four valve events at maximum or latest cut-off (which, for example, may be a steam cut-off at 60% of the piston stroke, when the valve motion is in "full-gear" position) then, as the reverse gear is "hooked-back" to adjust the valve for producing an earlier cut-off (for example, at 15% of the piston stroke) the other valve events, i. e. admission, release and compression, and particularly the release and compression points, will be materially distorted from the optimum value which is theoretically desired for such earlier cut-off. In view of this, it is customary to effect a compromise relationship between the valve events, which is not the most efficient either for early cut-off or for late cut-off operation of the engine. A further result of this practice is that a very wide range of cut-off adjustment is impractical, and particularly an extremely early cut-off, which is desirable at very high operating speeds, is not feasible, because of the extreme distortion of the other valve events, particularly exhaust and compression.

Efforts have been made to overcome these disadvantages, for example by constructing and setting the valves and valve gear to effect a variable cut-off throughout a limited range of relatively early cut-offs and providing supplemental means, such as supplemental valves for effecting a late cut-off for starting purposes. Another mode of attack upon this problem has been to set the range of cut-offs in the later region, and provide a supplemental cut-off valve in series with the main valve to effect the desired early cut-offs at the higher operating speeds of the engine.

Still other methods have been proposed, such as the utilization of separate inlet and exhaust valves, for example of the poppet type, which are operated by a series of shiftable rotating cams.

Such proposals have, however, met with indifferent success, owing to added complication of the mechanism and to operating and maintenance difficulties and also to the fact that the improvement in valve events which has been secured has been a minor one.

The present invention, broadly considered, contemplates combining within the valve gear itself the separate motions actuating such gear, in such a way that the said separate motions are combined in one ratio for controlling the admission and cut-off and in a different ratio for controlling the release and compression, and more particularly the employment of separate intake and exhaust valves for each cylinder and the actuation thereof from respectively different points of the valve motion work, more specifically from different points of the combining lever; whereby an adjustment of the valve gear varies the timing of the exhaust valves differently from the variation of the timing of the inlet valves, so that a substantial improvement in the relationship between the several valve events over the range of adjustment is secured; and preferably also the simultaneous adjustment of all the valves from a common control.

Still further, the invention contemplates the resultant practical possibility of operating the engine at earlier cut-offs and/or through a wider range of cut-off adjustment than heretofore practical; all of which, viewed broadly, constitutes a substantial improvement over prior practices as considered hereinabove.

Though not limited thereto in its broad aspects, the invention is especially adaptable to and advantageous in a valve motion mechanism of the type disclosed and claimed in my earlier filed, co-pending, application, Serial No. 58,504, filed January 10, 1936, now identified as Patent No. 2,136,405 of November 15th, 1938. Thus, in its more specific aspects, this invention is an improvement upon the valve motion mechanism disclosed in said co-pending application. Briefly stated, this type of valve motion contemplates actuation of the valve means solely from the reciprocating crossheads or other parts moving in unison with the pistons, having no operating connection from the wheels, axles or cranks or other unsprung parts of the running gear. In said valve motion, the valves for each cylinder are actuated by a combination of a movement derived from the piston in said cylinder and a movement derived from the piston in the cylinder on the opposite side of the locomotive, the two motions being variably combined by means of a radius rod adjustable in an oscillating link; and in the preferred embodiment of the present invention, specifically illustrated and described herein, the inlet and exhaust valves for each cylinder are separately actuated from different points on the lever which combines said two movements.

Still more specifically, the present invention contemplates a construction which retains all of the structural and operational advantages of the mechanism described in my aforementioned co-pending application (such as elimination of the valve gear operating connections from the driving wheels, simplification and improvement of the cross connections between the motion work driven from the crosshead on the right side and the motion work driven from the crosshead on the left side, capability of locating the motion work for the valves of both cylinders in a common central location and housing the same in a common box or casing for the retention of lubricant and the exclusion of foreign matter, and transmission of the crosshead movements to the valve gear in the casing by means of rock-shafts and delivery of the combined movements to the valve operating connections by means of rock-shafts, etc.) and adds thereto the advantages of substantial improvements in the relationship of the inlet and exhaust valve events throughout the range of cut-off adjustment, for both forward and reverse operation of the locomotive, and the attainment of the adjustment of all the valves simultaneously by means of a single or common control, and by relatively simple structural arrangements.

How the foregoing objects and advantages are secured, together with such others as may be incident to the invention, will be evident from the following description, taken together with the accompanying drawings, in which:

Brief description of drawings

Figure 8 is an irregular vertical section through the cylinder, valve chest and cam box of the locomotive structure of Figure 1, with certain parts shown in elevation, the section through the valve chest being approximately on the line 8—8 of Figure 2 to illustrate the steam inlet valves;

Figure 9 is a similar irregular vertical section through the cylinder, valve chest and cam box of the locomotive structure of Figure 1, the section through the valve chest being approximately on the line 9—9 of Figure 2 to illustrate the steam exhaust valves;

Figure 10 is an enlarged side elevation of the oscillating intake cam of Figure 8, showing the intake cam shaft in section;

Figure 11 is a similar enlarged side elevation of the oscillating exhaust cam of Figure 9, showing the exhaust cam shaft in section;

Figures 12, 13, 14 and 15 are fragmentary diagrammatic sections illustrating, respectively, at the points of preadmission, cut-off, release and compression, the relative angular positions of the intake cam and the exhaust cam and the corresponding position of the piston in the cylinder for a valve gear setting effecting a steam cut-off at 60% of the piston stroke (which is the full-gear position of the valve motion mechanism shown in Figures 1 to 7 inclusive), these four figures further including a diagrammatic showing of the inlet and exhaust poppet valves with their operating levers and cam followers for the head end only of the cylinder;

Figures 16, 17, 18 and 19 are diagrammatic views similar to Figures 12, 13, 14 and 15, but illustrating the relative positions of the intake cam, exhaust cam, and piston with the valve gear set for a cut-off at 15% of the piston stroke, the valves themselves being omitted in these views for the sake of simplification; and Figures 20 to 27 inclusive are eight diagrammatic views corresponding to Figures 12 to 19 inclusive, but illustrating, for the sake of graphic comparison, the four valve events (each at 60% and each at 15% cut-off) of the valve means when actuated by the valve motion mechanism of my aforementioned co-pending application No. 58,504.

Description of structure

Figure 1:
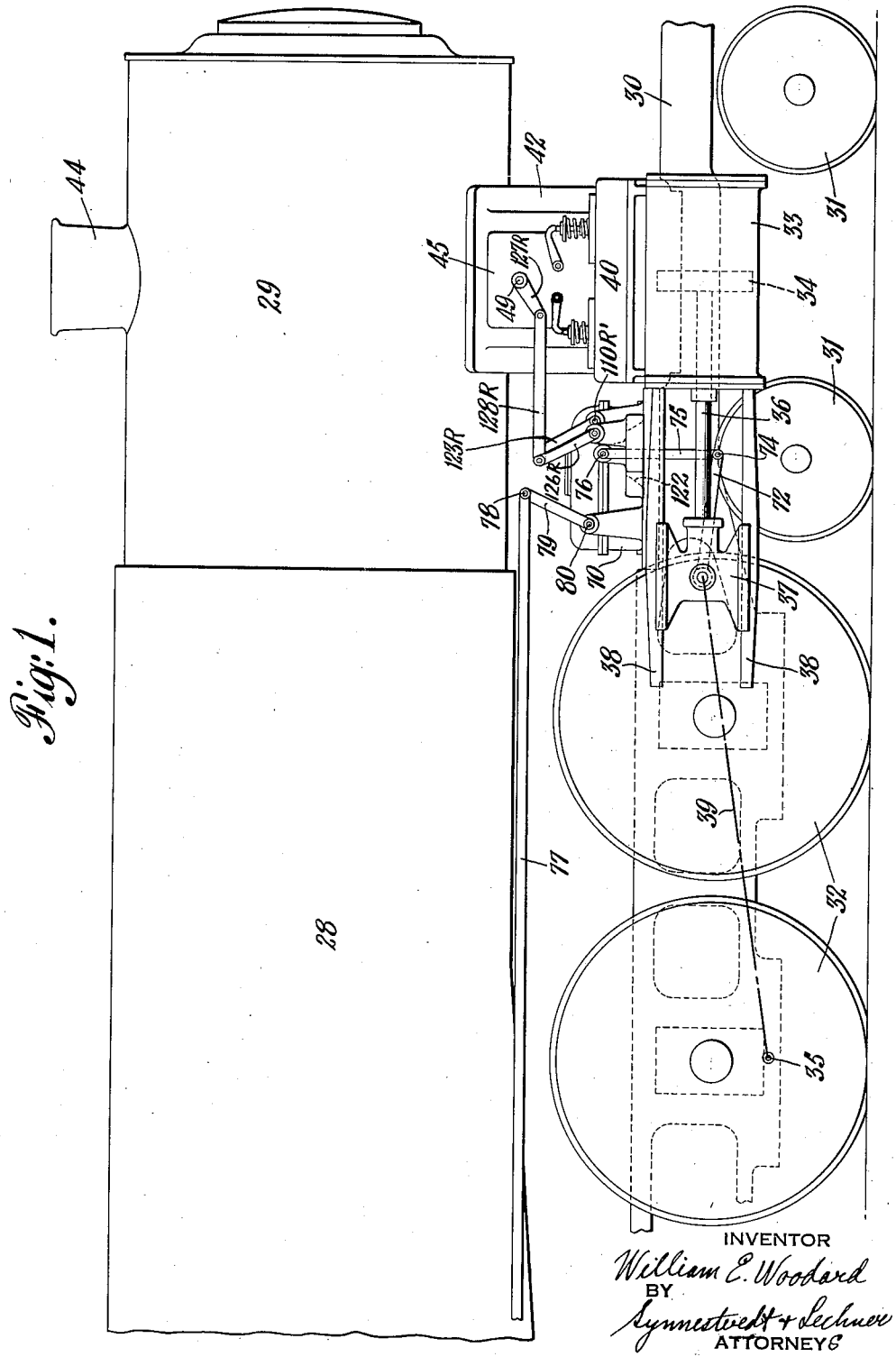
Figure 1 is a fragmentary, and somewhat diagrammatic, side elevational view of a locomotive, illustrating the application thereto of the present preferred embodiment of my improved valve motion mechanism.
Figure 2:
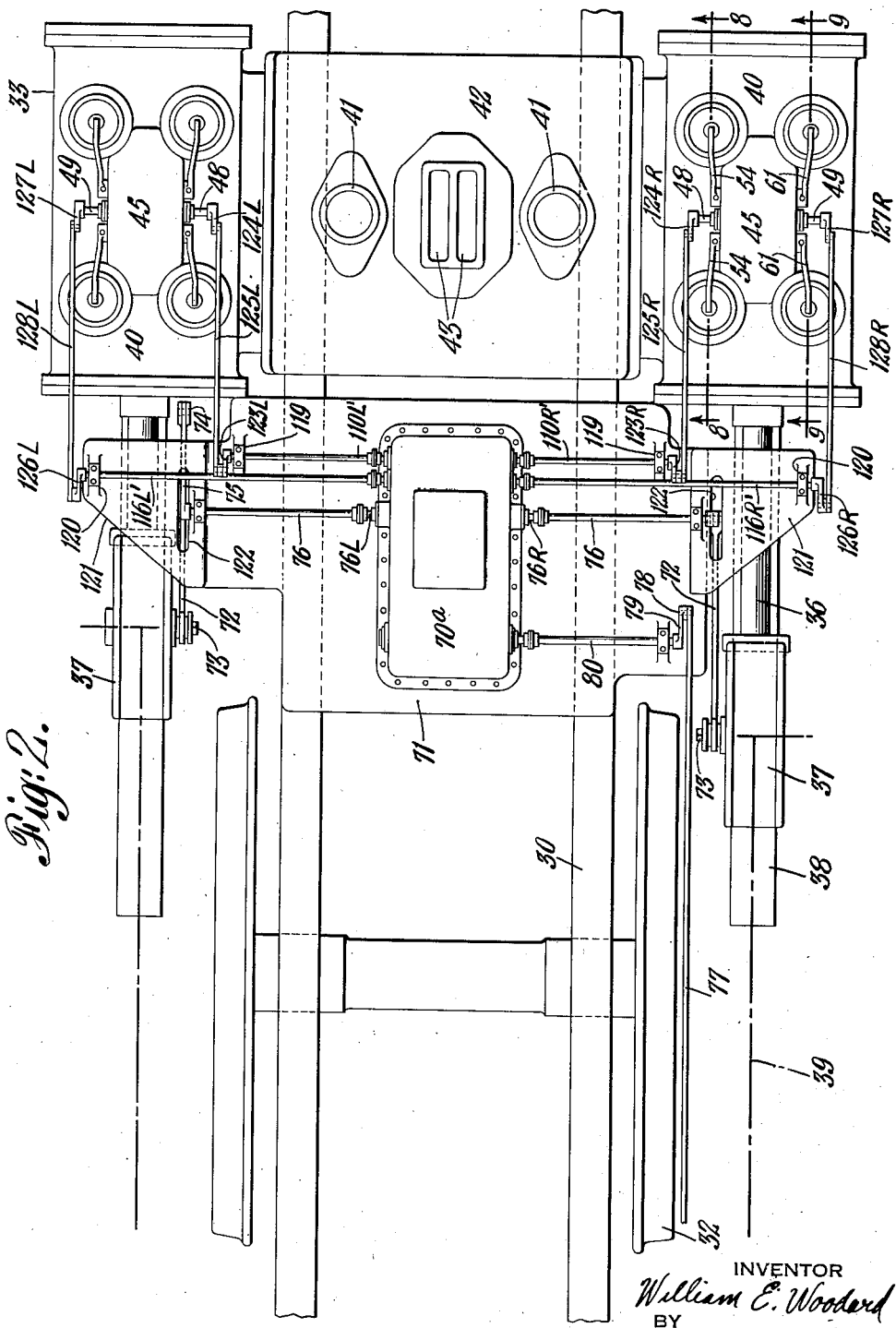
Figure 2 is a plan view, to a larger scale, of the forward portion of the locomotive chassis, and illustrating in top plan the arrangement of the present invention.
Figure 3:
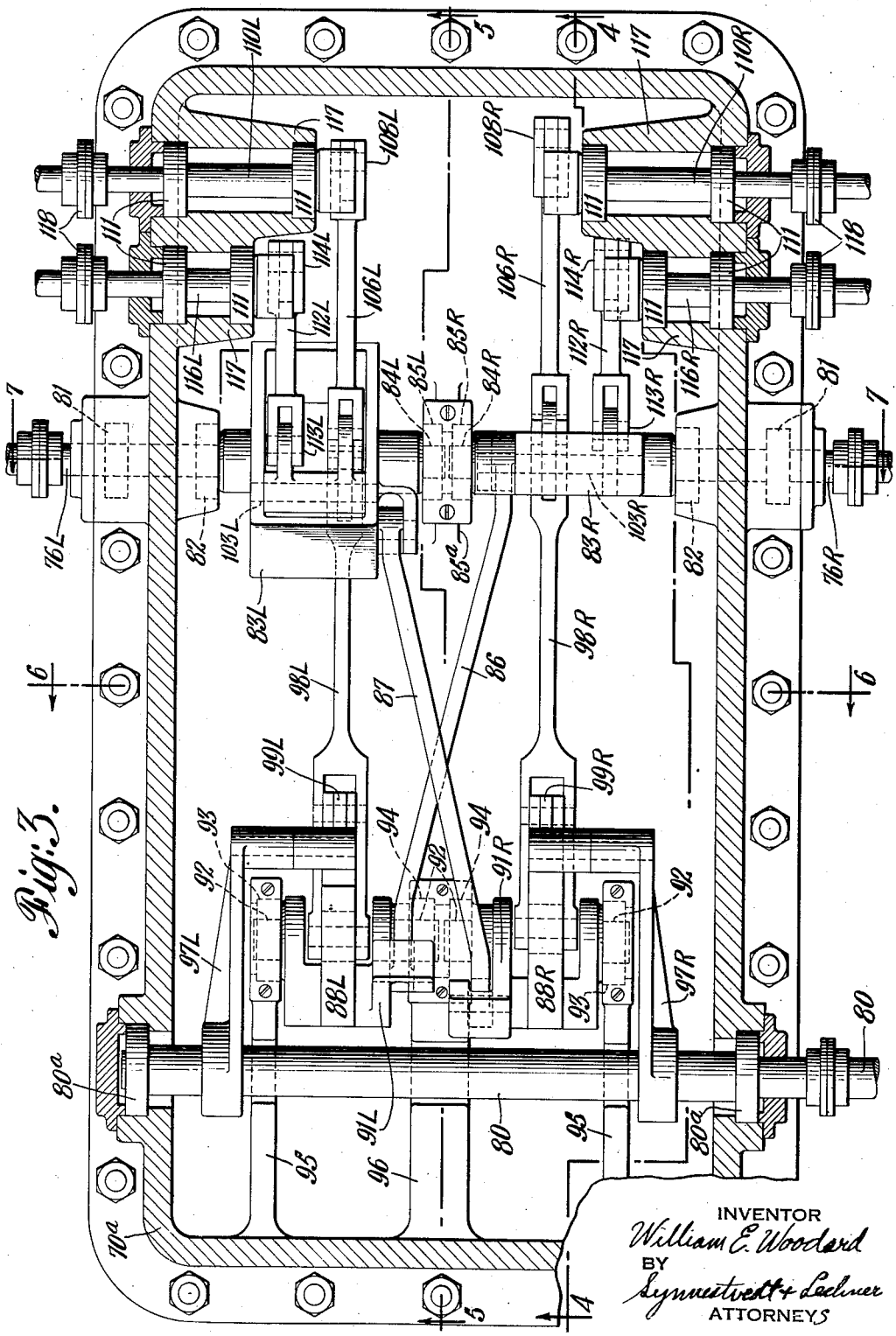
Figure 3 is a horizontal sectional view, on a still larger scale, through the valve gear box or casing, taken approximately on the line 3—3 of Figure 4, and illustrating the working parts of the mechanism in top plan.
Figure 4:
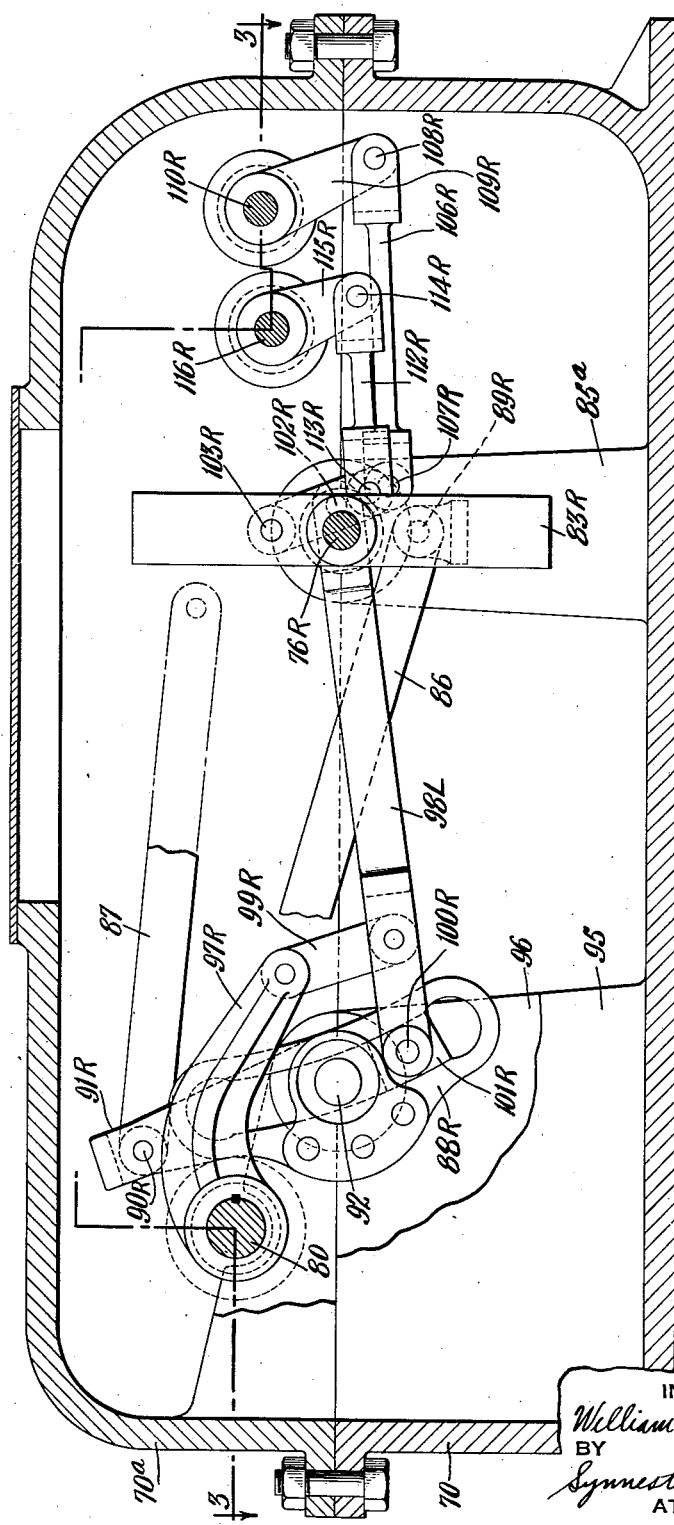
Figure 4 is a vertical longitudinal section taken about on the line 4—4 of Figure 3.
Figure 5:
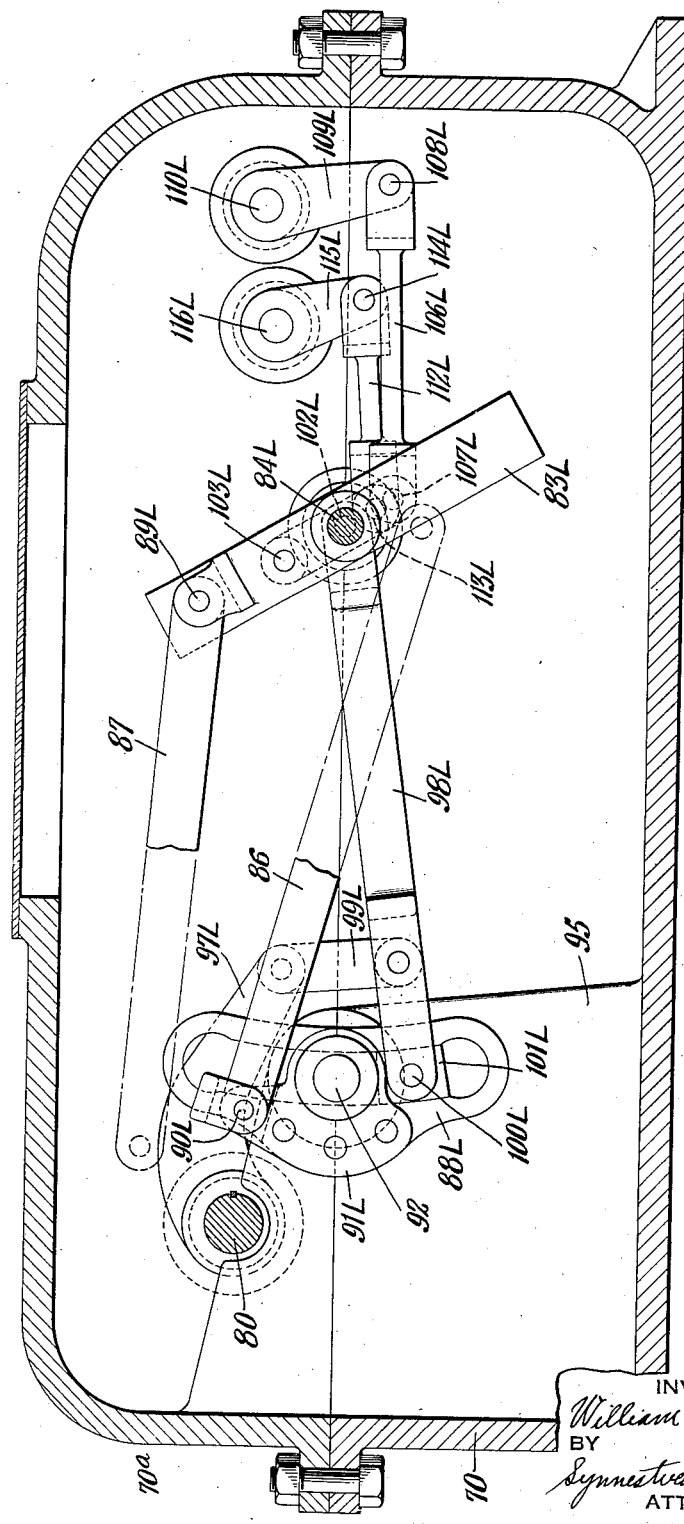
Figure 5 is a similar section taken about on the line 5—5 of Figure 3.
Figure 6:
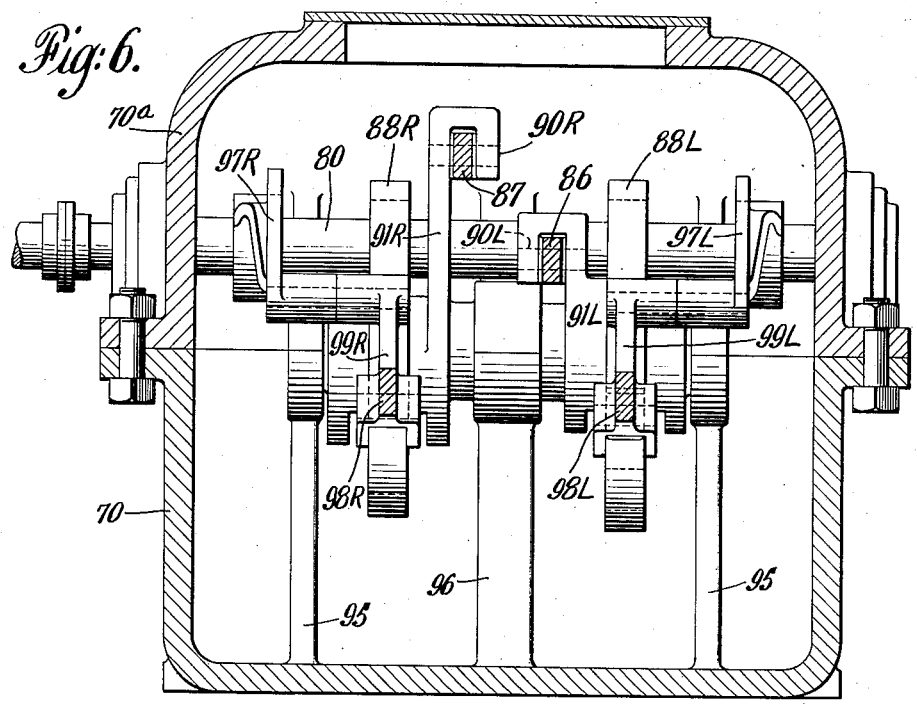
Figure 6 is a transverse section on the line 6—6 of Figure 3.
Figure 7:
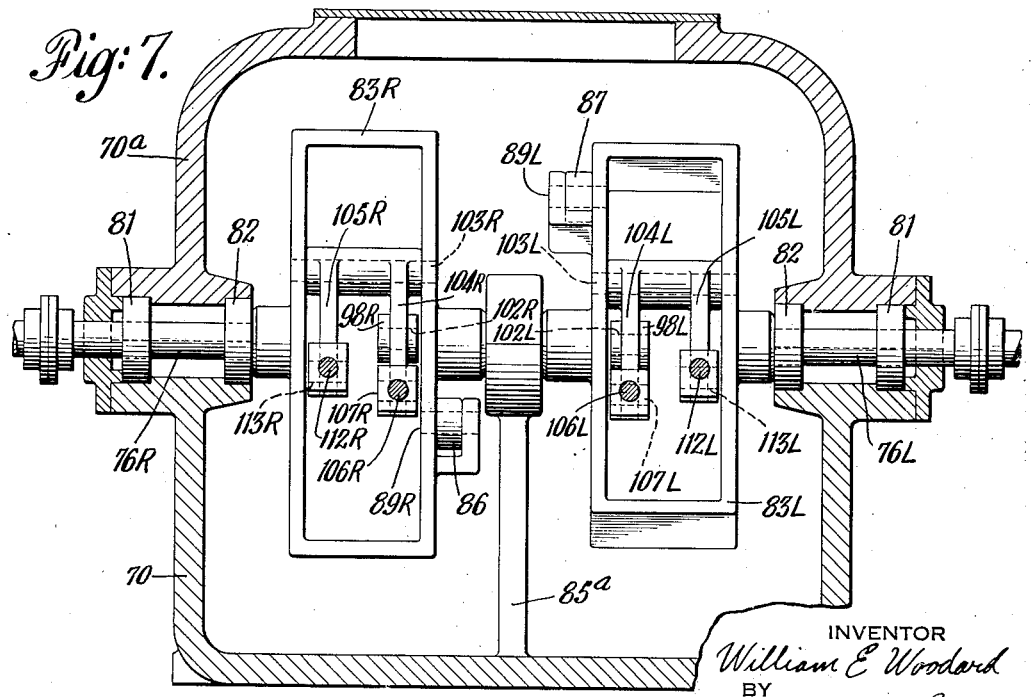
Figure 7 is a transverse section on the line 7—7 of Figure 3.

Referring now to Figures 1 and 2, illustrating the general arrangement of the mechanism, considered as a whole, it will be seen that the locomotive, having boiler 28, smoke-box 29, main frame 30, pilot truck wheels 31 and driving wheels 32, is provided with two cylinders 33, in each of which is a reciprocating piston 34 which is coupled to a main crank pin, diagrammatically shown at 35, by means of piston rod 36, crosshead 37 slidable in guides 38, and connecting rod diagrammatically shown at 39. In Figure 2, the upper crosshead guides are omitted, to clearly show the right-hand crosshead at about its mid-position, corresponding to the position of crank pin 35 (Figure 1) when the same has turned through approximately 90° from its forward dead center (the right-hand piston being at about the mid-position of its stroke); and showing the left-hand crosshead 37 at about its forwardmost position, corresponding to forward dead center of the left-hand crank pin and to extreme forward position of the left-hand piston; the two main cranks being set approximately 90° apart in accordance with standard practice. Thus, various driven parts of the locomotive running gear move in different phase relation, and in particular the reciprocating parts at the two sides undergo a varying relative motion in each cycle of operation, as is well known in this art; and it is from a plurality of such parts of the running gear that the valve motion mechanism of the present invention is actuated, as will appear later on.

Steam is admitted from the boiler 28 to the valve chests 40 as by conduits 41 which extend through the cylinder saddle 42; and the exhaust from the valve chests passes through passages 43 in the cylinder saddle and thence through the exhaust nozzle (not shown) to the stack 44 at the top of the smoke-box.

On top of each valve chest is a cam box 45 (seen also in Figures 8 and 9), the cam box for each cylinder enclosing an intake cam 46 and an exhaust cam 47, in side-by-side relation, which are respectively fixed upon separate shafts 48 and 49, for independent oscillation or rocking.

The intake cam 46 (see Figures 8 and 10) is adapted to actuate the two steam valves 50, one for the head end and one for the crank end of the cylinder, through the intermediation of cam followers or rollers 51, arms 52 each fast on a rock-shaft 53, which rock-shafts extend out through the wall of the cam box, external arms 54 which are fixed on said shafts 53, and valve stems 55, which latter may be spring-loaded toward valve closing position, by the springs 56.

The exhaust cam 47 (see Figures 9 and 11) is adapted to actuate the two exhaust valves 57, one for the head end and one for the crank end of the cylinder, through the intermediation of cam followers or rollers 58, arms 59 each fast on a rock-shaft 60, which rock-shafts extend out through the wall of the cam box, external arms 61 which are fixed on said shafts 60, and valve stems 62, which latter may be spring-loaded toward valve closing position, by the springs 63.

The valves shown herein are of the vertically moving poppet type, although it will be understood that horizontally moving poppet valves, or other types of valves, may be employed, by suitably altering the arrangement of the operating levers, rock-shafts and the like between the cams and the valves. The oscillating cams may also be of any suitable or known types.

Thus, the intake cam (Figure 10) has a low or valve seating face 64 and a high or valve lifting face 65, the respective valve being seated, when its follower rides down off the surface 65 to the respective striking point S. The head end and crank end striking points are in this embodiment (by way of example and not by way of limitation) located 26½°, respectively, from a common diametral line $d$—$d$. There may further be a slight drop of the surface 64 below the surface at the point S, as indicated at 66, so that a little clearance is left between the surface 64 and the cam followers, so as to assure tight seating of the steam valves, in accordance with known practice.

Similarly (as seen in Figure 11) the exhaust cam 47 has a low or seating surface 67 and a high or valve lifting surface 68, the surface 67 being dropped slightly, as shown at 69, below the striking point level, the two striking points S being each angularly positioned (in this particular example) 2½° from a common diametral line $d$—$d$.

Turning now to the valve motion mechanism proper, it will be seen from Figures 1 to 7 inclusive that the motion work is in large part enclosed in the box or casing 70 having a separable portion or cover member 70a, said casing being conveniently removably mounted on a suitable baseplate or other support 71 located on the main longitudinal frame members 30 of the locomotive, just back of the cylinder saddle 42. The motion work is actuated from the crossheads 37 by means of rods or links 72, one on each side of the locomotive, pivotally coupled at 73 to the crossheads and at 74 to the lower ends of arms 75, each arm 75 being fixed at its upper end upon a rock-shaft 76, these two shafts being disconnectibly coupled respectively to internal right and left rock-shafts 76R, 76L, which extend out through the right and left-hand walls, respectively, of the casing 70. A reversing rod or reach rod 77 (Figures 1 and 2) extends forwardly from the cab (not shown) and is pivotally coupled at 78 to an arm 79 fixed on the reversing shaft 80, which passes in through a side wall of the casing 70 for the variable adjustment and reversal of the valve gear.

Referring now more particularly to Figures 3 to 7, it will be observed that the actuating rock-shafts 76R, 76L, which are mounted in bearings 81, 82, are secured to and form an oscillating fulcrum for the respective right and left-hand primary oscillating members or yokes 83R, 83L, each having an additional pivot or trunnion 84R, 84L, mounted in side-by-side bearings 85R, 85L, in the central bracket or support 85a. The primary oscillating members 83R, 83L, are thus oscillated respectively in synchronism with the right and left-hand pistons of the engine.

A pair of diagonally crossing driving rods 86, 87 (best seen in Figure 3) are used respectively to transmit motion from the two primary oscillating members 83R, 83L, to the left and right-hand oscillating links 88L, 88R. The member 86 is pivotally coupled to the lower end of yoke 83R at 89R and the member 87 is pivotally coupled to the upper end of yoke 83L at 89L. The opposite ends of these members 86 and 87 are coupled to the swinging links above the centers of oscillation of the latter, by the respective pins 90L and 90R, through the intermediation of bracket or yoke members 91R, 91L, fixed to said links and serving to oscillatably mount the links on trunnions 92, 92. Suitable anti-friction bearings 93, 94 (similar to the ball bearing assemblies 81 and 82 of the shafts 76R, 76L) serve to journal the said trunnions in the upstanding brackets 95 and 96.

The reversing shaft 80, mounted in suitable bearings 80a, carries a pair of arms 97R, 97L, which act to raise and lower the radius rods 98R, 98L, through the medium of lifting links 99R, 99L, pivotally coupling the radius rods to the arms, as shown, whereby to alter and reverse the valve gear setting, the radius rods being slidably coupled or associated with the links 88R and 88L by means of pivotal connections 100R, 100L, to the slidable link blocks 101R, 101L. It will be noted that both link blocks are in their lowermost position, for forward full-gear operation, corresponding to 60% cut-off. By rearward motion of reverse reach rod 77 (Figures 1 and 2), the link blocks, with the associated rear ends of the radius rods, can be raised to any desired extent, up to the full-gear reverse position.

The forward ends of the radius rods 98R, 98L, are pivotally connected at 102R, 102L, to the combining levers which are pivotally mounted respectively at 103R, 103L, in the right and left-hand primary oscillating means 83R, 83L. Up to this point, the motion work, as described with reference to Figures 3 to 7 inclusive, is the same in principle as the valve motion claimed in my aforementioned co-pending application 58,504, and it is in this type of valve gear that my present improvement is preferably incorporated, as will now be described.

According to the present invention, the right-hand combining lever, which combines the motion of the oscillating yoke 83R derived from the right-hand crosshead with the motion of the link 88R derived from the left-hand crosshead, comprises a combining lever arm 104R for operating the steam admission valves of the right-hand cylinder, and a second combining lever arm 105R for operating the steam exhaust valves of the right-hand cylinder. In other words, two separate valve actuating connections are taken off from the combining lever structure considered as a unit; the effective length or throw of the exhaust arm 105R of the combining lever being shorter than that of the admission controlling arm 104R. The same is true of the combining lever mechanism 104L, 105L, for the left-hand side of the engine.

The double take-off from the combining lever mechanism comprises, for the two sides of the engine, steam valve driving rods 106R, 106L, pivotally coupled at 107R, 107L, to the combining levers, and at their forward ends pivotally coupled at 108R, 108L, to the lower ends of arms 109R, 109L, fixed respectively on valve actuating rock-shafts 110R, 110L, which are mounted in anti-friction bearings 111 and pass out through the side walls of the casing.

Similarly, for the exhaust valve actuating take-off, the mechanism comprises actuating rods 112R, 112L, which are pivotally coupled at 113R, 113L, to the arms 105R, 105L, and are at their forward ends pivotally coupled at 114R, 114L, to the lower ends of arms 115R, 115L, fixed on the exhaust valve actuating rock-shafts 116R, 116L, which latter are similarly journalled in bearings 111 and extend out through the side walls of the box. Suitable integral bosses 117 are provided for mounting the rock-shaft bearings in the casing walls, and disconnectible couplings 118 are provided externally thereof, for connecting the various internal shafts to their external extensions 110R', 110L', 116R', 116L', which latter are supported by outboard bearings carried on suitable brackets 119, 120, the latter being mounted on lateral extensions 121 of the baseplate 71 (see Figure 2) which are further apertured at 122 to pass the operating arms 75 which are coupled to the crossheads.

The extreme outer ends of the steam valve actuating rock-shafts 110R', 110L' are connected to the respective steam admission cam shafts 48 in the cam boxes 45, by means of levers 123R, 123L, fixed on said rock-shafts, levers 124R, 124L, fixed on said cam shafts, and interconnecting links 125R, 125L, pivotally coupled to said levers, as shown (see also Figure 8).

Similarly, the outer ends of exhaust valve actuating rock-shafts 116R', 116L', are coupled to the respective exhaust cam shafts 49 in the cam boxes 45, by means of levers or arms 126R, 126L, fixed on said rock-shafts, arms 127R, 127L, fixed on said exhaust cam shafts 49, and interconnecting links 128R, 128L, pivotally coupled to said arms, as shown.

With cams, valves and associated parts of the configuration and arrangement shown in Figures 8 to 11, the valve motion mechanism as above described can be arranged to effect, for example, a steam cut-off at 60% of the piston stroke when the valve motion mechanism is in full-gear position (the position shown in Figures 1 to 7 inclusive). As seen in Figures 1, 2 and 8, with the locomotive operating in forward motion, the right-hand piston at mid-position in the cylinder, and steam working on the head end of said piston, steam from pipe 41 delivered to steam chamber 41a is passing the open steam valve 50 (at the head end) and is flowing into the cylinder through the portage, as shown by the arrows. The admission cam 46 is at this moment being turned by the valve motion in a counterclockwise direction, as shown in Figure 8, and is approaching the point of cut-off, which will take place when the piston 34 has travelled 60% of its stroke. The admission valve 50 at the crank end of the cylinder remains closed, of course, at this time.

At this same moment in the operation of the right-hand piston 34, as will be seen in Figure 9, the exhaust valve 57 at the crank end is open, and the exhaust steam in that end of the cylinder is going past said valve and through the exhaust chamber 43a to the exhaust pipe 43, as indicated by the arrows. The exhaust cam 47 is turning counterclockwise toward the position where it will permit closure of the open valve 57, whereby to effect compression, which occurs when the piston 34 has yet to traverse 12½% of its stroke toward the crank end.

Description of operation

A complete cycle of the valve events for the head end of one cylinder is graphically illustrated in Figures 12 to 15 inclusive, for a valve gear setting providing a cut-off at 60% of the stroke.

As shown in Figure 12, the intake cam has been turned through an angle of 26½° from mid-position, so that the cam follower or roller of the intake valve for the head end of the cylinder is just at the striking point of the intake cam, and as this cam is turning in a clockwise direction, the valve is just about to be lifted to admit steam to the head end of the cylinder. This is the point of admission (termed herein "preadmission", as it occurs just before the piston has completed its stroke in the direction of the arrow) and in this embodiment it occurs with .777% of the piston stroke still to be traversed. At this time the exhaust cam at the head end is at an angular position 31½° from its mid-position, and the exhaust valve at the head end remains, of course, in closed position.

As shown in Figure 13, the piston is now assumed as having moved back 60% of its stroke, which is the point of cut-off, the intake cam moving counterclockwise as shown by the arrow, and the cam roller being just at the striking point. The head end exhaust valve remains in closed position, the cam, however, being on its counterclockwise oscillation, at an angular position 42½° from mid-position.

As shown in Figure 14, when the piston has traversed 89.7% of its rearward stroke, the exhaust cam for the head end is still rotating counterclockwise and the cam roller is just at the striking point (2½° from mid-position), at which the release commences to take place. The head end admission valve is, of course, closed, the intake cam being at an angular position 6¾° from the mid-position.

As shown in Figure 15, after the piston has completed its rearward travel and has returned to a point 12½% of its stroke from the head end, compression occurs by closing of the head end exhaust valve, the exhaust cam at this time turning clockwise, and the cam roller having just come opposite the striking point, 2½° from mid-position of the cam. The head end intake valve is, of course, maintained closed at this time, and its cam (which is at an angle of 3° from mid-position) is moving clockwise, preparatory to again effecting the preadmission illustrated in Figure 12.

Thus the diagrammatic figures, 12 to 15, illustrate the four valve events at the head end of one cylinder, throughout one cycle. Similar events occur, of course, at both ends of each cylinder, in proper phase relation to each other and in proper timed relation to the pistons in the several cylinders, which are in different phase relation as they are of course coupled to drive relatively angled cranks. It should especially be noted from these diagrammatic figures that the angular position of the intake cam relative to the angular position of the exhaust cam varies substantially, at different points of the cycle. In short, as these two cams are actuated by driving connections taken off from different points on the combining lever, the timing of intake and exhaust events can be relatively varied in a way not heretofore possible.

Figures 16 to 19 inclusive illustrate a cycle of operation similar to that of Figures 12 to 15, but at a setting of the variable valve gear for 15% cut-off. At this setting it will be seen from the diagrammatic figures that preadmission takes place at 4.463% from the end of the piston stroke, cut-off at 15% of the stroke, release at 63.2% of the stroke, and compression at 43.3% from the head end on the return stroke. While the release and compression occur earlier than they do at a 60% cut-off setting, yet the timing of these events represents a very substantial improvement over prior practice in this art.

Operating results as compared with prior practice

How the improvement is effected by the operating mechanism of the valve gear, and the extent of the improvement, will be made clear by a consideration of the following:

In a valve motion mechanism wherein the admission and exhaust events are all determined by a single operating connection taken off from the combining lever, as in my aforementioned prior application 58,504 (to which reference may be made for a more detailed study, if desired), the timing of both the intake valves and the exhaust valves is determined by a combination of: first, a motion of uniform amplitude and bearing a constant directional relation to the motion of the corresponding piston, said motion being derived from the primary oscillating member in the valve gear box, driven by said piston; and second, a motion which is capable of being varied in amplitude and of being reversed in direction, which is derived from the link driven by the primary oscillating member on the opposite side which is actuated from the opposite piston. The combining of these two motions is effected at the combining lever, in which the ratio of lever arms for both intake and exhaust valve timing is identical, since there is in such prior construction only a single point of take-off from the combining lever to actuate both the intake and the exhaust valves. Hence, in such prior construction, when choosing the proportions of the combining lever (i. e. the ratio of the lever arms), such a ratio of arms must be chosen as will give the best compromise timing of the admission and exhaust valves, whereby to obtain the best all around compromise of the valve events throughout the range of cut-offs.

By contrast with the foregoing, the present invention, in providing two take-offs from the combining lever at different points (this being done for convenience by means of the two members 104R, 105R, of different lengths—or 104L, 105L) makes it possible to secure separate combining lever ratios for the admission valves and the exhaust valves, each best suited for the valves driven thereby. That is, such ratio of combining lever arms may be chosen for driving the admission valves as is best suited for the timing thereof, and such different ratio of the combining lever arms for driving the exhaust valves can be chosen as will best suit the timing of the latter. Since the mechanism is actuated by and combines the motions of driven parts of the locomotive running gear which are moving in different phase relation (preferably the reciprocating motions of the crossheads), i tis obvious that the different lever arm ratios result in controlling the admission valve events by one ratio of said motions and the exhaust valve events by a different ratio thereof.

Figures 20 to 23 inclusive are diagrammatic views similar to Figures 12 to 15 inclusive, but illustrate the valve events in a mechanism such as shown in my aforesaid prior application in which both the admission and exhaust valves are actuated from the same point on the combining lever mechanism. With such a mechanism the angular relationship between the intake and exhaust cams must remain constant since they are driven by a common connection, with the result that the release and compression events occur earlier than they do with the present improved mechanism, release occurring at 86.6% of the stroke, and compression at 17.6% from the end of the return stroke, when the valve gear is set for 60% cut-off.

As shown by Figures 24 to 27 inclusive, which illustrate the events at 15% cut-off with a mechanism such as shown in my prior application, the undesirably earlier release and compression are also present. In short, the exhaust valve events, with such prior construction, are less favorable throughout the entire range of valve gear adjustment than they are with the present improved mechanism. It may also be here pointed out that the results shown in Figures 20 to 27 inclusive are typical of various types of valve gear heretofore employed. The comparison between prior mechanisms and the present mechanism may be further illustrated, in tabular form, as follows:

*Single take-off from combining lever, for operating both the admission and exhaust valves (prior practice)*

Ratio of arms of combining lever, both intake and exhaust
$$\frac{11\tfrac{5}{8}''}{7\tfrac{1}{2}''}$$

| Cut-off | Release point percent of stroke | Compression point percent from end of return stroke |
|---|---|---|
| Percent 60 | 86.6 | 17.6 |
| 15 | 60.5 | 47.1 |

*Double take-off from combining lever, one for admission and one for exhaust (example of the present invention)*

Ratio of arms of combining lever, intake
$$\frac{11\tfrac{5}{8}''}{7\tfrac{1}{2}''},$$
exhaust
$$\frac{10\tfrac{1}{2}''}{7\tfrac{1}{2}''}$$

| Cut-off | Release point percent of stroke | Compression point percent from end of return stroke |
|---|---|---|
| Percent 60 | 89.7 (an improvement of 3.7%) | 12.5 (an improvement of 29%) |
| 15 | 63.2 (an improvement of 4.46%) | 43.3 (an improvement of 8.1%) |

The above readings were taken from full-sized working models, in which, for the two cut-offs chosen, all the structural parts, including the cams, were identical, with the exception of the ratios of the combining lever arms, which as shown by the table were modified for operating the exhaust valves separately from the admission valves in accordance with the present invention. The ratios of the arms, in inches, represent, of course, only one example, and are not intended as limitations on the ratios which may be chosen. By choosing still other ratios of the admission and exhaust combining lever arms and/or by choosing still other contours for the intake and exhaust cams, other degrees of improvement in the valve events may be secured.

Since the valve motion parts of my earlier structure and the structure of the present improvement, from which the comparative readings of the above table were taken, were made identical (with the exception of the ratios of the exhaust combining lever arms, as above noted), I have herein illustrated the external connecting levers 126R, 127R (Figs. 1 and 9) and 123R, 124R (Figs. 1 and 8) as having similar proportions to the generally corresponding parts shown in Figure 1 of my said copending application, though not to the same scale.

However, it should be clearly understood that the invention is not limited to particular proportions any more than to a particular scale, and this is especially true of the external linkage between the valve gear proper and the valve cams, since the desired timing of the valve events is secured by the design of the valve motion mechanism itself, and the external connecting linkages may as usual be changed or adjusted, primarily to secure the proper angular oscillation of cams of different sizes and to accommodate the valve gear to locomotives of different proportions and dimensions, without affecting the intended timing of the valve events.

From the foregoing, it will now be evident that by the use of the double ratio combining levers, the release point and the compression point have been arranged to occur later than heretofore, for a given point of cut-off. This is highly desirable, as in any valve motion the ideal sought for is to secure as late a release as practicable, together with as late a compression as practicable. If these events occur too soon, particularly at short cut-offs, with relation to the piston stroke, there is a loss of power and a rough operation of the locomotive engine. Such conditions impose practical limits upon the degree to which the cut-off can be shortened with valve motions heretofore in use.

In addition to the foregoing, when the present invention is embodied in a valve motion mechanism of the type disclosed in my prior application (i. e., the centralized, enclosed type, wherein the movements of the mechanism are derived from the crossheads only, the motions from the two opposite crossheads being combined) the present invention secures all the structural and operational advantages of my said application No. 58,504, but adds thereto the improvement of the timing of the valve events. Further elaboration of the essential principles of operation of this type of valve motion is believed to be unnecessary, as the said principles are fully set forth in said application, to which reference may be made.

While maintaining simplicity of structure, particularly of the major part of the motion work including the common control for all valves, the invention accomplishes substantial advantages over the valve gears of the prior art including that of my own prior application, by means of the double take-off from the combining lever mechanism; and in the preferred embodiment illustrated the connections from there to the valves comprise the relatively simple arrangement of double-take-off rock-shafts at each side of the valve-gear casing, double rods extending forwardly in parallelism, and separately driven cams on separate cam-shafts for the separate steam and exhaust valves.

I claim:

1. In a locomotive engine or the like having a pair of cylinders and driven parts actuated by steam delivered to the cylinders; separately operating steam and exhaust valve means for each cylinder; and, for the valve means of each cylinder, valve motion mechanism actuated by and combining the motion of a plurality of driven parts moving in different phase relation and having driving connections to the steam valve means and to the exhaust valve means constructed to control the steam admission and cut-off events by one ratio of the combined motions and to control the exhaust and compression events by a different ratio of the combined motions.

2. In a locomotive engine or the like having a pair of cylinders and at each side reciprocating parts actuated by steam delivered to the cylinders; separately operating steam and exhaust valve means for each cylinder; and, for the valve means of each cylinder, valve motion mechanism actuated by and combining the motions of a reciprocating part on one side of the engine and a reciprocating part on the other side of the engine and including means connected to operate the steam and exhaust valve means respectively in accordance with different ratios of the combined motions.

3. In a locomotive engine or the like having cylinders, pistons and associated driven parts, the combination of steam admission valve means controlling admission and cut-off, separate steam exhaust valve means controlling release and compression, and a valve motion mechanism comprising apparatus actuated by such driven parts and including means combining the motions derived from a plurality of said parts, valve driving connections coupling said combining means to said admission valve means, and other valve driving connections coupling said combining means to said exhaust valve means, the steam and exhaust valve connections being coupled to said combining means at different points, whereby the exhaust valves are actuated by a different ratio of said combined movements than are the admission valves.

4. In a locomotive engine or the like having cylinders, pistons and associated driven parts, the combination of steam admission valve means controlling admission and cut-off, separate steam exhaust valve means controlling release and compression, and a valve motion mechanism comprising apparatus actuated by said driven parts and including means combining the motions derived from a plurality of said parts, means for adjustably varying the relative proportion of the different motions so combined, valve driving connections coupling said combining means to said admission valve means, and other valve driving connections coupling said combining means to said exhaust valve means, the steam and exhaust valve connections being coupled to said combining means at different points, whereby the relationship of the exhaust valve events to the admission valve events is improved throughout the range of adjustment of said adjustable means.

5. In a locomotive engine or the like having cylinders, pistons and associated driven parts, the combination of steam admission valve means, controlling admission and cut-off, separate steam exhaust valve means controlling release and compression, and a valve motion mechanism comprising apparatus actuated by said driven parts and including means combining the motions derived from a plurality of said parts, means for adjustably varying the relative proportion of the different motions so combined throughout both a forward and a reverse operating range, valve driving connections coupling said combining means to said admission valve means, and other valve driving connections coupling said combining means to said exhaust valve means, the steam and exhaust valve connections being coupled to said combining means at different points, whereby the relationship of the exhaust valve events to the admission valve events is improved in both forward and reverse operation.

6. In a locomotive engine or the like having at each side a cylinder and reciprocating piston therein, the two pistons operating in different phase, the combination of steam admission valve means for each of said cylinders, steam exhaust valve means for each of said cylinders functioning separately from the respective steam admission valve means, and a valve motion mechanism comprising a pair of members oscillated respectively by and in synchronism with the reciprocating motions of said pistons, means combining the motions derived from said members for actuating the valve means of one cylinder, means combining the motions derived from said members for actuating in a different phase the valve means for the other cylinder, and for each cylinder valve-driving connections coupling the respective combining means to the admission valve means and other valve-driving connections coupling said combining means to the exhaust valve means, the steam and exhaust valve connections being coupled to said combining means at different points, whereby the exhaust valves are actuated by a different ratio of said combined movements than are the admission valves.

7. In a locomotive engine or the like having at each side a cylinder and reciprocating piston therein, the two pistons operating in different phase, the combination of steam admission valve means for each of said cylinders, steam exhaust valve means for each of said cylinders functioning separately from the steam admission valve means, and a valve motion mechanism comprising a pair of members oscillated respectively by and in synchronism with the reciprocating motions of said pistons, means combining the motions derived from said members for actuating the valve means of one cylinder, means combining the motion derived from said members for actuating in a different phase the valve means for the other cylinder, means for adjustably varying the relative proportion of the different motions so combined, and for each cylinder valve-driving connections coupling the respective combining means to the admission valve means and other valve-driving connections coupling said combining means to the exhaust valve means, the steam and exhaust valve connections being coupled to said combining means at different points, whereby the relationship of the exhaust valve events to the admission valve events is improved throughout the range of adjustment of said adjustable means.

8. In a locomotive engine or the like having at each side a cylinder and reciprocating piston therein, the two pistons operating in different phase, the combination of steam admission valve means for each of said cylinders, steam exhaust valve means for each of said cylinders functioning separately from the steam admission valve means, and a valve motion mechanism comprising a pair of members oscillated respectively by and in synchronism with the reciprocating motions of said pistons, means combining the motions derived from said members for actuating the valve means of one cylinder, means combining the motions derived from said members for actuating in a different phase the valve means for the other cylinder, means for adjustably varying the relative proportion of the different motions so combined throughout both a forward and a reverse operating range, and for each cylinder valve-driving connections coupling the respective combining means to the admission valve means and other valve-driving connections coupling said combining means to the exhaust valve means, the steam and exhaust valve connections being coupled to said combining means at different points, whereby the relationship of the exhaust valve events to the admission valve events is improved in both forward and reverse operation.

9. For an engine having a pair of cylinders and pistons, and for each cylinder separately acting admission and exhaust valves, a valve motion mechanism comprising parts actuated in unison with one of the pistons, parts actuated in unison with the other piston, means combining the motion of parts actuated by the two pistons and coupled to the admission valves for actuating the same, and means differently combining said motions and coupled to the exhaust valves for actuating them.

10. A valve motion mechanism in accordance with claim 9, in which the major portion of the motion work is located between the vertical planes of the cylinders, the separate actuating connections for the admission and exhaust valves being carried laterally outwardly to points adjacent the longitudinal planes of the cylinders.

11. A valve motion mechanism in accordance with claim 9, in which the major portion of the motion work is located between the vertical planes of the cylinders, the separate actuating connections for the admission and exhaust valves being carried laterally outwardly to points adjacent the longitudinal planes of the cylinders, and including longitudinally extending connections, for the valves of each cylinder, located in side-by-side planes.

12. For an engine having a pair of cylinders and pistons, and for each cylinder separately acting admission and exhaust valves, a valve motion mechanism comprising parts actuated in unison with one of the pistons, parts actuated in unison with the other piston, means combining the motion of parts actuated by the two pistons and coupled to the admission valves for actuating the same, and means differently combining said motions and coupled to the exhaust valves for actuating them, said means comprising admission and exhaust combining lever mechanism of different lever arm ratios for the admission and the exhaust.

13. The combination, in a locomotive engine, with a pair of laterally positioned cylinders and their pistons, of a valve chest for each cylinder with separate admission and exhaust poppet valves therein, for each cylinder a cam box with separately oscillatable intake and exhaust valve actuating cams, a valve motion mechanism located in large part between the vertical planes of the cylinders and having actuating connections from the pistons, said mechanism including means for combining the motions derived from the two pistons in a predetermined timed relationship to the movement of one of said pistons, and means for combining the motions from said two pistons in a similar predetermined timed relationship to the other piston but in different phase, and for each side of the engine valve-cam actuating connections for the intake and exhaust cams taken off from the respective combining means at different points.

14. The combination, in a locomotive engine, with a pair of laterally positioned cylinders and their pistons, of a valve chest for each cylinder with separate admission and exhaust poppet valves therein, for each cylinder a cam box with separately oscillatable intake and exhaust valve actuating cams, a valve motion mechanism located in large part between the vertical planes of the cylinders and having actuating connections from the pistons, said mechanism including means for combining the motions derived from the two pistons in a predetermined timed relationship to the movement of one of said pistons, and means for combining the motions from said two pistons in a similar predetermined timed relationship to the other piston but in different phase, and for each side of the engine valve-cam actuating connections for the intake and exhaust cams taken off from the respective combining means at different points, said connections extending laterally from the valve motion mechanism proper and longitudinally to points adjacent the cams where they are coupled thereto for oscillating them.

15. The combination, in a locomotive engine, with a pair of laterally positioned cylinders and their pistons, of a valve chest for each cylinder with separate admission and exhaust poppet valves therein, for each cylinder a cam box with separately oscillatable intake and exhaust valve actuating cams, a valve motion mechanism located in large part between the vertical planes of the cylinders and having actuating connections from the pistons, said mechanism including means for combining the motions derived from the two pistons in a predetermined timed relationship to the movement of one of said pistons, and means for combining the motions from said two pistons in a similar predetermined timed relationship to the other piston but in different phase, and for each side of the engine valve-cam actuating connections for the intake and exhaust cams taken off from the respective combining means at different points, said connections extending laterally from the valve motion mechanism proper and longitudinally to points adjacent the cams where they are coupled thereto for oscillating them, there being a common enclosure for the major portion of the valve motion mechanism proper, and the independent connections to the intake and exhaust cams comprising separate rockshafts extending laterally through the walls of said enclosure.

16. In a locomotive engine or the like having a pair of cylinders with double-acting reciprocating pistons therein and separately acting steam and exhaust poppet valves for each end of each cylinder, for each cylinder an oscillatable cam commonly controlling the steam valves for both ends of the cylinder and a separately acting oscillatable cam commonly controlling the exhaust valves for both ends of the cylinder, valve motion mechanism driven by and including means combining the motions derived from the two reciprocating pistons, means coupling said mechanism to the steam valve cams for imparting thereto a movement which is a combination of said motions in one ratio, and means coupling said mechanism to the exhaust valve cams for imparting thereto a movement which is a combination of said motions in a different ratio.

17. In a locomotive engine or the like having a pair of cylinders with double-acting reciprocating pistons therein and separately acting steam and exhaust poppet valves for each end of each cylinder, for each cylinder an oscillatable cam commonly controlling the steam valves for both ends of the cylinder and a separately acting oscillatable cam commonly controlling the exhaust valves for both ends of the cylinder, valve motion mechanism driven by and including means combining the motions derived from the two reciprocating pistons, means coupling said mechanism to the steam valve cams for imparting thereto a movement which is a combination of said motions in one ratio, and means coupling said mechanism to the exhaust valve cams for imparting thereto a movement which is a combination of said motions in a different ratio, and a control common to the valve motion mechanism for both cylinders for altering the proportion of the two motions delivered to the combining means.

18. In a locomotive engine or the like having a pair of cylinders with double-acting reciprocating pistons therein and separately acting steam and exhaust poppet valves for each end of each cylinder, for each cylinder an oscillatable cam commonly controlling the steam valves for both ends of the cylinder and a separately acting oscillatable cam commonly controlling the exhaust valves for both ends of the cylinder, valve motion mechanism driven by and including means combining the motions derived from the two reciprocating pistons, means coupling said mechanism to the steam valve cams for imparting thereto a movement which is a combination of said motions in one ratio, and means coupling said mechanism to the exhaust valve cams for imparting thereto a movement which is a combination of said motions in a different ratio, and a control common to the valve motion mechanism for both cylinders, and coupled to relatively movable parts thereof to reverse the direction of one of the two motions delivered to the combining means.

19. In a locomotive engine or the like having a pair of cylinders and driven parts actuated by steam delivered to the cylinders; separately operating steam and exhaust valve means for each cylinder; and, for the valve means of each cylinder, valve motion mechanism actuated by and combining the motion of a plurality of driven parts moving in different phase relation and having driving connections to the steam valve means and to the exhaust valve means constructed to control the steam admission and cut-off events by one ratio of the combined motions and to control the exhaust and compression events by a different ratio of the combined motions; and a control common to the valve motion mechanism for both cylinders and coupled to movable elements of said mechanism to reverse the direction and vary the amplitude of the motion derived from at least one of the driven parts actuating the valve motion mechanism.

20. In a locomotive engine or the like having cylinders, pistons and associated driven parts, the combination of steam admission valve means controlling admission and cut-off, separate steam exhaust valve means controlling release and compression, and a valve motion mechanism comprising apparatus actuated by such driven parts and including means combining the motions derived from a plurality of said parts, valve driving connections coupling said combining means to said admission valve means, and other valve driving connections coupling said combining means to said exhaust valve means, the steam and exhaust valve connections being coupled to said combining means at different points, whereby the exhaust valves are actuated by a different ratio of said combined movements than are the admission valves, and a control common to the valve motion mechanism for both cylinders and coupled to movable elements of said mechanism to reverse the direction and vary the amplitude of the motion derived from at least one of the driven parts actuating the valve motion mechanism.

21. For an engine having a pair of cylinders and pistons, and for each cylinder separately acting admission and exhaust valves, a valve motion mechanism comprising parts driven in unison with one of the pistons, parts driven in unison with the other piston, means combining the motion of parts actuated by the two pistons and coupled to the admission valves for actuating the same, and means differently combining said motions and coupled to the exhaust valves for actuating them, said means comprising admission and exhaust combining lever mechanism of different lever arm ratios for the admission and the exhaust, and a control common to the valve motion mechanism for both cylinders and coupled to movable elements of said mechanism to reverse the direction and vary the amplitude of the motion derived from at least one of the driven parts actuating the valve motion mechanism.

22. In a reciprocating fluid-pressure engine having a plurality of cylinders and driven parts actuated by the fluid delivered thereto, for each cylinder separately-acting inlet and exhaust valve means, the one controlling admission and cut-off and the other controlling release and compression, and valve motion apparatus comprising mechanism actuated by and combining in one ratio the motions of a plurality of said driven parts moving in different phase relation and coupled to the inlet valve means for actuating the same and mechanism combining said motions in a different ratio and coupled to the exhaust valve means for actuating the same.

WILLIAM E. WOODARD.